(12) United States Patent
Tanaka (10) Patent No.: US 12,164,136 B2
(45) Date of Patent: Dec. 10, 2024

(54) DISPLAY DEVICE AND OPTICAL ELEMENT FOR USE IN THE DISPLAY DEVICE

(71) Applicant: SHIMADZU CORPORATION, Kyoto (JP)

(72) Inventor: Masato Tanaka, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 199 days.

(21) Appl. No.: 17/797,679

(22) PCT Filed: Feb. 7, 2020

(86) PCT No.: PCT/JP2020/004712
§ 371 (c)(1),
(2) Date: Aug. 4, 2022

(87) PCT Pub. No.: WO2021/157044
PCT Pub. Date: Aug. 12, 2021

(65) Prior Publication Data
US 2023/0152505 A1 May 18, 2023

(51) Int. Cl.
*F21V 8/00* (2006.01)
*G02B 27/01* (2006.01)

(52) U.S. Cl.
CPC ......... *G02B 6/0038* (2013.01); *G02B 6/0028* (2013.01); *G02B 6/0031* (2013.01); *G02B 6/0076* (2013.01); *G02B 2027/0118* (2013.01)

(58) Field of Classification Search
CPC .. G02B 6/0028; G02B 6/0031; G02B 6/0038; G02B 6/0076; G02B 2027/0118
See application file for complete search history.

(56) References Cited

U.S. PATENT DOCUMENTS 8,548,290 B2 * 10/2013 Travers ................. G02B 27/01
359/569
10,133,067 B2 11/2018 Kamiya
(Continued)

FOREIGN PATENT DOCUMENTS

| CN | 104536138 A | 4/2015 |
| JP | H0821748 A | 1/1996 |

(Continued)

OTHER PUBLICATIONS

First Office Action dated May 9, 2023 for corresponding Japanese Patent Application No. 2021-575544.
(Continued)

*Primary Examiner* — Daniel Petkovsek
(74) *Attorney, Agent, or Firm* — Muir Patent Law, PLLC (57) ABSTRACT

A display device includes an image display element, a collimator, a first light guide formed of a flat plate transparent to light, a second light guide formed of a plate member transparent to the light and having one surface that is a flat surface in contact with one of surfaces of the first light guide and the other surface that is a sawtooth surface, and a beam splitter formed on an interface between the first and second light guides to transmit a part of the light and reflect the remainder thereof. The sawtooth surface is configured by alternately combining a first surface non-parallel to a propagating direction of the light propagating through the second light guide after passing through the interface and configured to transmit the light and a second surface substantially parallel to the propagating direction.

12 Claims, 2 Drawing Sheets

(56) References Cited

U.S. PATENT DOCUMENTS

| | | | |
|---|---|---|---|
| 11,022,799 B2* | 6/2021 | Maimone | G02B 27/0081 |
| 11,598,971 B2* | 3/2023 | Ishii | G02B 27/283 |
| 2014/0092482 A1 | 4/2014 | Dubroca et al. | |
| 2014/0192418 A1 | 7/2014 | Suzuki | |
| 2016/0124223 A1* | 5/2016 | Shinbo | G02B 27/0101 |
| | | | 385/37 |
| 2016/0306170 A1 | 10/2016 | Sarayeddine et al. | |
| 2017/0031161 A1 | 2/2017 | Rossini | |

FOREIGN PATENT DOCUMENTS

| | | | | |
|---|---|---|---|---|
| JP | 201361480 A | 4/2013 | | |
| JP | 2014-512574 A | 5/2014 | | |
| JP | 2015118223 A | 6/2015 | | |
| WO | WO-2010067117 A1 * | 6/2010 | | G02B 27/01 |

OTHER PUBLICATIONS

Extended European Search Report dated Mar. 14, 2023 issued for the corresponding European Patent Application No. 20917896.1.
Second Office Action dated Sep. 5, 2023 issued for the corresponding Japanese Patent Application No. 2021-575544.
Written Opinion ISA237 for PCT application PCT/JP2020/004712 dated Apr. 7, 2020, submitted with a machine translation.

* cited by examiner

DISPLAY DEVICE AND OPTICAL ELEMENT FOR USE IN THE DISPLAY DEVICE

TECHNICAL FIELD

The present invention relates to a display device and an optical element for use in the display device.

BACKGROUND ART

Recently, a display device called a "head-up display" has been proposed. This display device projects characters and/or an image (hereinafter collectively referred to as "image") onto a screen to form a virtual image through virtual image optics including a combiner in front of the eyes of a pilot of an aircraft or a driver of a vehicle. In such a display device, generally, in order to compactly configure the device, luminous flux is formed by converting the light emitted from each point of an image display element with an expansion into collimated light by a collimator, and the luminous flux is introduced into a light guide to be enlarged.

As an example of such a device, Patent Document 1 describes a display device provided with a light guide. The light guide is provided, in a flat glass plate, with a reflective surface that reflects the light incident from the collimator in a predetermined direction and a plurality of beam splitters translucent to visible light. This display device is set such that the luminous flux introduced into the light guide is reflected at the interface between the flat plate and the outside in a direction satisfying the toral reflection condition. With this, the luminous flux propagates in a zigzag fashion while being repeatedly totally reflected in the light guide to be entered to one of the beam splitters. In the beam splitter, a part of the incident luminous flux is emitted to the outside of the flat plate from the interface between the flat plate and the outside by being reflected in a direction that does not cause the total reflection at the interface between the flat plate and the outside, and the remainder of the incident luminous flux transmits the beam splitter. The luminous flux that has transmitted the first beam splitter is incident on the second beam splitter, and the part of the incident luminous flux is reflected in the same direction as the luminous flux reflected by the first flat plate to be emitted to the outside of the flat plate, and the remainder of the luminous flux passes through the beam splitter. Such emission of the luminous flux from the flat plate occurs at the position of all of the beam splitters, and the luminous flux emitted from each point on the image becomes a larger luminous flux than when it was incident on the light guide and is emitted from the light guide. When the luminous flux is incident on the observer's eye, the visible range of the observer is enlarged.

PRIOR ART DOCUMENT

Patent Document

Patent Document 1: U.S. Pat. No. 10,133,067

SUMMARY OF THE INVENTION

Problems to be Solved by the Invention

In the display device described in Patent Document 1, not only the light of the image generated by the image forming unit but also the light incident on the interface between the flat plate and the outside from the outside of the light guide are incident on the light guide through the interface and then exit to the outside of the light guide again, resulting in stray light to be incident on the eyes of the observer.

An object to be solved by the present invention is to provide a display device capable of suppressing stray light to be incident on the eyes of an observer and an optical element for use in the display device.

Means for Solving the Problem

A display device according to the present invention made to solve the above-described problems is provided with:
 an image display element configured to display an image to be displayed;
 a collimator configured to convert light emitted from each point on the image displayed on the image display element into collimated light;
 a first light guide formed of a flat plate made of a first material transparent to the light;
 a second light guide formed of a plate member made of a second material transparent to the light, the second light guide having one surface and the other surface, the one surface of the second light guide being a flat surface in contact with one of surfaces of the flat plate of the first light guide, the other surface of the second light guide being a sawtooth surface; and
 a beam splitter formed at an interface between the first light guide and the flat surface of the second light guide, the beam splitter being configured to transmit a part of the light and reflect the remainder of the light,
 wherein the sawtooth surface of the second light guide is configured by alternately combining a first surface and a second surface, the first surface being non-parallel to a propagating direction of the light propagating through the second light guide after passing through the interface and being configured to transmit the light, and the second surface being substantially parallel to the propagating direction.

An optical element for use in a display device according to the present invention is an optical element for use in a display device configured to display an image in an enlarged manner based on light obtained by converting light emitted from each point on an image displayed on an image display element into collimated light by a collimator.

The optical element is provided with:
 a first light guide formed of a flat plate made of a first material transparent to the light;
 a second light guide formed of a plate member made of a second material transparent to the light, the second light guide having one surface and the other surface, the one surface of the second light guide being a flat surface in contact with one of surfaces of the flat plate of the first light guide, the other surface of the second light guide being a sawtooth surface; and
 a beam splitter formed on an interface between the first light guide and the flat surface of the second light guide, the beam splitter being configured to transmit a part of the light and reflect the remainder of the light,
 wherein the sawtooth surface of the second light guide is configured by alternately combining a first surface and a second surface, the first surface being non-parallel to a propagating direction of the light propagating through the second light guide after passing through the interface and being configured to transmit the light, the second surface being substantially parallel to the propagating direction.

Note that the second material may be the same as the first material.

Also, note that the term "substantially parallel to the propagating direction" regarding the light should not be construed as being strictly parallel to the propagating direction but may be construed as being inclined slightly (e.g., ±15°) with respect to the parallel direction.

Effects of the Invention

In the display device and the optical element for use in the display device according to the present invention, the light emitted from each point on the image displayed on the image display element and converted into collimated light by the collimator is incident on the beam splitter. A part of the light incident on the beam splitter passes through the beam splitter and is emitted from the first surface of the second light guide. The remainder of the light, i.e., the light reflected by the beam splitter without passing therethrough, is reflected by the surface of the flat plate of the first light guide on the opposite side of the beam splitter and is incident on another position of the beam splitter. A part of the incident light passes through the beam splitter and exits from a position different from the position of the first surface of the second light guide where the light first was emitted. In this way, the beam splitter repeatedly causes the partial transmission of the light and the reflection of the remainder of the light, and the light that has passed through the first surface of the second light guide is emitted. As a result, the light from each point on the image becomes larger than that when it was incident on the first light guide. This increases the range in which the observer can visually view the image. Note that the second surface of the second light guide is substantially parallel to the propagating direction of the light, and therefore, the light is prevented from being obstructed by the second surface. This prevents a partial shadow from occurring in the light that has passed through the first surface to be reached the eyes of the observer.

On the other hand, the light (external light) incident on the sawtooth surface of the second light guide from the outside of the display device is at least partially incident on the second surface or is incident on the second surface after being reflected by the first surface. On the second surface, absorption, reflection, diffusion, dimming, etc., of the light occur. Therefore, it is possible to suppress the incidence of the external light on the light guide. For this reason, it is possible to suppress stray light, which is external light to be emitted to the outside of the light guide again after being incident on the light guide, from being incident on the eyes of the observer.

EMBODIMENTS FOR CARRYING OUT THE INVENTION

With reference to FIGS. 1 to 4, some embodiments of a display device and an optical element for use in the display device according to the present invention will be described.

Figure 1:
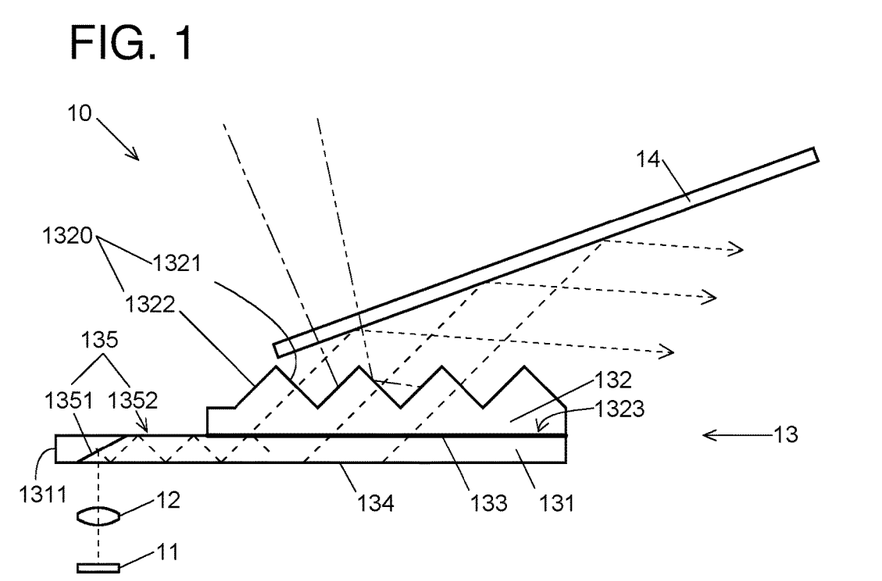
FIG. 1 is a schematic configuration diagram showing a first embodiment of a display device according to the present invention.

(1) Configuration of Display Device and Optical Element for Use in the Display Device of First Embodiment FIG. 1 shows a schematic configuration diagram of a display device 10 of a first embodiment. This display device 10 is provided with an image display element 11, a collimator 12, an optical element 13 for use in the display device, and a combiner 14. The optical element 13 for use in the display device is provided with a first light guide 131, a second light guide 132, and a beam splitter 133. Hereinafter, these constitutional elements of the display device 10 will be described below.

The image display element 11 is an element for displaying an image (hereinafter referred to as "original image") prior to enlargement, which is a base of an image to be displayed on the display device 10 of the first embodiment. The image display element 11 may be a transmissive liquid crystal display element, a reflective liquid crystal display element, a digital micromirror device (DMD), an organic EL display element, a micro-LED display element, or the like.

The collimator 12 is an optical element for converting the light emitted with a spread from each point of the original image displayed on the image display element 11 into collimated light. The collimator 12 is configured by a lens, a mirror, and the like.

The first light guide 131 is configured by a rectangular flat plate for guiding the light converted by the collimator 12. The first light guide 131 is configured by a transparent first material. As the first material, various kinds of optical glasses, resins, and the like, can be used. Within the first light guide 131 in the vicinity of one end 1311 in the rectangular long-side direction, a reflective surface 1351 inclined at a predetermined angle with respect to the flat plate is formed. The collimator 12 is arranged such that the light emitted from the collimator is incident on the reflective surface 1351. The predetermined angle is set such that the light reflected by the reflective surface 1351 satisfies the total reflection condition at the interface between the flat plate and the outside (air). The reflective surface 1351 may be formed, for example, by cutting a flat plate into the same cut surface as the reflective surface 1351, applying a coating of a light reflecting material to the cut surface, and then rejoining them.

The second light guide 132 is configured by a plate member made of a second material transparent to the light. The second light guide 132 has a flat surface 1323 and a sawtooth surface 1320. The flat surface 1323 is in contact with a portion of the surface of the flat plate of the first light guide 131 on a side opposite to the end 1311 than the reflective surface 1351. The sawtooth surface 1320 faces the flat surface 1323. As the second material, optical glass, resin, or the like, can be used as in the case of the first material. The first material and the second material may be the same or different from each other. However, the first material and the second material are selected so as to have a refractive index satisfying a condition that total internal reflection does not occur on the flat surface 1323 when the light is incident on the interface between the first light guide 131 and the second light guide 132 at an angle satisfying the total reflection condition at the interface between the flat plate of the first light guide 131 and the outside (air).

At the interface in which the first light guide 131 and the second light guide 132 are in contact with each other, a beam splitter 133 that transmits a part of the light and reflects the remainder of the light is provided. In this embodiment, the interface has been subjected to optical coating to allow the transmission of the light at a predetermined transmission. Note that instead of subjecting the interface to optical coating as described above, a first light guide and a second light guide made of materials different in refractive index from each other may be combined to utilize the reflection due to the difference in the refractive index. In this way, by bonding the first light guide 131 and the second light guide 132, it is possible to function the bonding surface as a beam splitter.

As described above, the first light guide 131, the second light guide 132, and the beam splitter 133 are provided. Thus, the light reflected by the reflective surface 1351 propagates toward the other end side while being totally reflected by both surfaces of the flat plate at the portion 1352 of the first light guide 131 not in contact with the second light guide 132 and is incident on the beam splitter 133. The reflective surface 1351 and the portion 1352 of the first light guide 131 not in contact with the second light guide 132, which correspond to an optics for causing the light to be incident on the beam splitter 133, are collectively referred to as an "introductory optics 135" in the first embodiment.

The sawtooth surface 1320 has a first surface 1321 and a second surface 1322. The first surface 1321 and the second surface 1322 are non-parallel to each other, and both of them are not parallel to the flat surface 1323. The first surface 1321 and the second surface 1322 are alternately arranged in the long-side direction. The first surface 1321 is a surface non-parallel (in this embodiment, substantially perpendicular) to the light propagating through the second light guide 132 after having been passed through the beam splitter 133 at an angle satisfying the total reflection condition at the interface between the flat plate of the first light guide 131 and the outside (air). On the other hand, similarly, the second surface 1322 is a surface substantially parallel to the light propagating through the second light guide 132. The first surface 1321 and the second surface 1322 are configured as described above. Thus, the light propagating through the second light guide 132 is emitted to the outside through only the first surface 1321, almost without passing through (being incident on) the second surface 1322.

In this embodiment, the second surface 1322 is coated with black paint that is a light absorber for absorbing visible light. With this, the external light incident on the second surface 1322 from the outside (indicated by a dashed line in FIG. 1) is shielded by the second surface 1322. In addition, the external light (indicated by a two-dot chain line) incident on the second surface 1322 after being reflected by the first surface 1321 is shielded by the second surface 1322. That is, such external light is absorbed by the light absorber to be incident on the second light guide 132 without passing through the second surface 1322. Note that no light absorber is applied to the first surface 1321.

Although the sawtooth surface 1320 having the same shape and size is arranged at substantially equal intervals in this embodiment, it is also possible to use a sawtooth surface that differs in shape and/or size, or to arrange a sawtooth surface at unequal intervals.

Note that the second light guide 132 has a shape similar to a diffraction grating at first glance but does not function as a diffraction grating because the interval of the sawtooth surface 1320 is sufficiently longer (e.g., 10 times or more) than the wavelength (0.4 to 0.7 μm) of visible light.

The light reflected by the beam splitter 133 is incident on the surface 134 of the flat plate of the first light guide 131 on the opposite side of the beam splitter 133 but is totally reflected by the surface 134 because the total reflection condition is satisfied at the surface 134.

The combiner 14 is a plate member that transmits a part of visible light and reflects the remainder of the visible light. The combiner 14 is arranged such that it faces the sawtooth surface 1320 and is non-parallel to the light on the optical path of the light emitted from the first surface 1321. With this, a part of the light emitted from the first surface 1321 is reflected by the combiner 14 and is visually recognized by the observer viewing the combiner 14 from the direction (rightward in FIG. 1) in which the light is reflected. At the same time, the observer can view the region on the opposite side of the combiner 14 through the combiner 14.

(2) Operation of Display Device and Optical Element for Use in the Display Device of First Embodiment The operations of the display device 10 and the optical element 13 for use in the display device of the first embodiment will be described.

In the image display element 11, an original image is displayed, and light is emitted from each point on the image with a spread. The light is converted into collimated light at the collimator 12. This light is introduced into the first light guide 131 and reflected by the reflective surface 1351. Thereafter, the light propagates toward the side of the second light guide 132 while being totally reflected on both surfaces of the flat plate at the portion 1352 of the first light guide 131 not in contact with the second light guide 132 and is incident on the beam splitter 133.

The beam splitter 133 transmits a part of the incident light and reflects the remainder of the light. The light reflected by the beam splitter 133 is totally reflected by the surface 134 and then is again incident on the beam splitter 133 on the side opposite to the reflective surface 1351 (right side in FIG. 1) farther than the position where the light was first incident on the beam splitter 133. A part of the incident light transmits the beam splitter 133, and the remainder of the light is reflected by the beam splitter 133. As described above, the beam splitter 133 causes repeated transmission and reflection of the light at a plurality of mutually different locations, but the light that has passed through at the respective positions are parallel to each other (see the dashed lines in FIG. 1).

The light that has passed through the beam splitter 133 propagates in the second light guide 132 and passes through the first surface 1321 to be emitted to the outside.

The light emitted from the first surface 1321 is at least partially reflected by the combiner 14 and reaches the eyes of the observer looking at the combiner 14 from the direction (the right direction in FIG. 1) in which the light was reflected. As described above, the light that has passed through the beam splitter 133 at different locations are parallel to each other, but are incident on the eyes of the observer while maintaining the parallel relation even after being reflected by the combiner 14. With this, the light emitted from each point of the original image displayed on the image display element 11 and converted into collimated light at the collimator 12 is incident on the eyes of the observer as light larger than when it was emitted from the collimator 12. Therefore, the range in which the observer can visually recognize the image is enlarged.

Note that the second surface 1322 of the second light guide 132 is substantially parallel to the propagating direction of the light, which suppresses the blocking of the light by the second surface 1322. As a result, it is possible to suppress the generation of partial shadows in the light that has passed through the first surface 1321 and reached the eyes of the observer.

On the other hand, the at least external light (see the dashed line in FIG. 1) directly incident on the second surface 1322 of the second light guide 132 and the external light (see the two-dot chain line in FIG. 1) incident on the second surface 1322 after being reflected by the first surface 1321 out of the external light incident on the optical element 13 for use in the display device from the outside are absorbed by the light absorber of the second surface 1322. Therefore, it is possible to prevent that the external light incident on the second surface 1322 is incident on the second light guide 132 (is further incident on the first light guide 131) and then is emitted to the outside of the second light guide 132 to be incident on the eyes of the observer. Therefore, it is possible to suppress stray light.

In the display device 10 and the optical element 13 for use in the display device of this embodiment, the following effects can be exerted in addition to the effect of suppressing stray light as described above. That is, it is enough to provide only one beam splitter 133 at the interface between the first light guide 131 and the second light guide 132. For this reason, it is possible to more easily produce the display device and the optical element for use in the display device than that described in Patent Document 1 in which a plurality of beam splitters must be formed inside the light guide.

Figure 2:
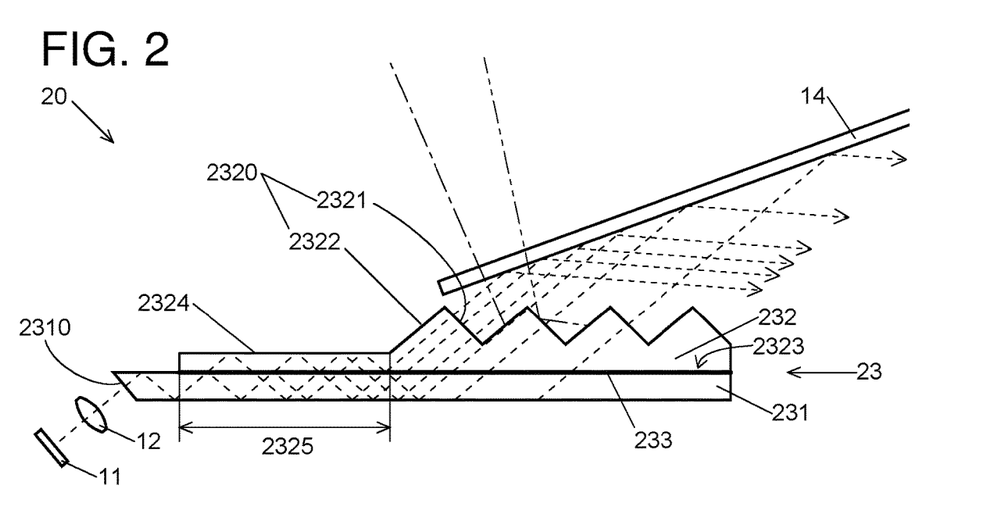
FIG. 2 is a schematic configuration diagram showing a second embodiment of a display device according to the present invention.

(3) Configuration of Display Device and Optical Element for Use in the Display Device of Second Embodiment FIG. 2 shows a schematic configuration diagram of a display device 20 according to a second embodiment. The display device 20 is provided with an image display element 11, a collimator 12, and a combiner 14, in the same manner as in the display device 10 of the first embodiment. It is further provided with an optical element 23 for use in the display device that differs from that of the first embodiment. The optical element 23 for use in the display device is provided with a first light guide 231, a second light guide 232, and a beam splitter 233. Hereinafter, the configuration of the optical element 23 for use in the display device will be mainly described.

The first light guide 231 is configured by a rectangular flat plate made of a first material transparent to the light converted by the collimator 12. The end face 2310 of at one end of the rectangular long-side direction (one short-side of the rectangle) has a shape formed by cutting obliquely with respect to the upper and lower surfaces of the flat plate. Note that in the display device 20 of the second embodiment, the same first light guide 131 as that of the first embodiment may be used. Alternatively, in the display device 10 of the first embodiment, the same first light guide 231 as that of the second embodiment may be used.

The second light guide 232 is a plate member made of a second material transparent to the light. The second light guide 232 is provided with a flat surface 2323, a sawtooth surface 2320, and a second flat surface 2324. The flat surface 2323 is a surface in contact with a portion of the surface of the flat plate of the first light guide on the opposite side of the end face 2310 of the flat plate of the first light guide 231. The sawtooth surface 2320 is a surface provided on a part of the surface facing the flat surface 2323 on a side opposite to the end face 2310. The second flat surface 2324 is a surface provided in a region (hereinafter referred to as "second flat surface forming region 2325) of the surface facing the flat surface 2323 closer to the end face 2310 than the sawtooth surface 2320. The sawtooth surface 2320 has a configuration in which a first surface 2321 and a second surface 2322 are alternately combined in the same manner as the sawtooth surface 1320 of the first embodiment. In the same manner as in the first embodiment, the second surface 2322 is coated with a light absorber for absorbing visible light.

As the first material forming the first light guide 231 and the second material forming the second light guide 232, the same first material and the same second material as in the first embodiment are used, respectively.

The collimator 12 is arranged so as to face the end face 2310 of the first light guide 231. The direction of the collimator 12 is set to satisfy both of the following conditions with respect to the optical element 23 for use in the display device. That is, these conditions include a condition that the light to be introduced into the first light guide 231 after being emitted from the collimator 12 is totally reflected at the interface between the first light guide 231 and the outside and the condition that the light is totally reflected at the interface between the second flat surface 2324 and the outside of the second light guide 232.

The beam splitter 233 is made of an optical coating for allowing the light to pass therethrough at a predetermined transmission, the optical coating being applied to the interface at which the first light guide 231 and the second light guide 232 are in contact with each other. Note that the beam splitter 233 is provided not only at a position facing the sawtooth surface 2320 of the second light guide 232 but also on the second flat surface forming region 2325.

(4) Operation of Display Device and Optical Element for Use in the Display Device of Second Embodiment The operation of the display device 20 and the optical element 23 for use in the display device of the second embodiment will be described. The operation from the emission of the light from each point of the original image displayed on the image display element 11 with a spread to the conversion of the light into the collimated light at the collimator 12 is the same as that in the first embodiment.

This light is introduced from the end face 2310 to the first light guide 231 and reaches the second flat surface forming region 2325 while repeating the total reflection at the interface between the first light guide 231 and the outside. In the second flat surface forming region 2325, a part of the light passes through the beam splitter 233 and is totally reflected by the second flat surface 2324, and the remainder of the light is reflected by the beam splitter 233. The light totally reflected by the second flat surface 2324 and the light reflected by the beam splitter 233 are parallel to each other and propagate along the optical paths offset in the longitudinal direction of the first light guide 231 (see the dashed lines in FIG. 2). All of the light is totally reflected by the surface of the first light guide 231 on the opposite side of the beam splitter 233 and is again incident on the beam splitter 233. A part of the light incident on the beam splitter 233 passes through the beam splitter 233 and is totally reflected by the second flat surface 2324, and the remainder of the light is reflected by the beam splitter 233. As described above, the light repeats the reflection at different positions, i.e., at the second flat surface 2324 and at the beam splitter 233. Thereafter, the light passes through the beam splitter 233 to reach the first surface 2321 of the sawtooth surface 2320 and is emitted from the first surface 2321 toward the combiner 14. The subsequent operations are the same as those of the display device 10 of the first embodiment.

According to the display device 20 and the optical element 23 for use in the display device of this embodiment, the light passes through a number of paths offset from each other in the longitudinal direction of the first light guide 231 to thereby spread in the direction. With this, it is possible to eliminate or reduce the region through which the light does not pass through the first surface 2321, which enables the observer to visually recognize an image with less unevenness.

Further, according to the display device 20 and the optical element 23 for use in the display device of this embodiment, similarly to the first embodiment, it exerts the following effects. That is, at least the external light directly incident on the second surface 2322 of the second light guide 232 out of the external light incident on the optical element 23 for use in the display device from the outside is absorbed by the light absorber of the second surface 2322. Further, at least the external light reflected by the first surface 2321 and then incident on the second surface 2322 out of the external light incident on the optical element 23 for use in the display device from the outside is absorbed by the light absorber of the second surface 2322. As a result, stray light can be suppressed.

(5) Modified Embodiments

The present invention is not limited to the above-described embodiments, and various modifications can be made.

For example, in the above-described embodiments, it is configured such that the second surface 1322 (2322) absorbs visible light to attain the light-shielding. However, the second surface 1322 (2322) may be subjected to coating to reflect or diffuse visible light. Alternatively, an external mask for shielding visible light may be attached to the second surface 1322 (2322).

Further, the second surface 1322 (2322) may be subjected to coating, processing, or the like to absorb, reflect, or diffuse a part of external light to cause dimming. In such a case, it is possible to suppress the incidence of the external light on the second light guide 132 (232) to cause stray light, though not as effective as the light-shielding.

Figure 3:
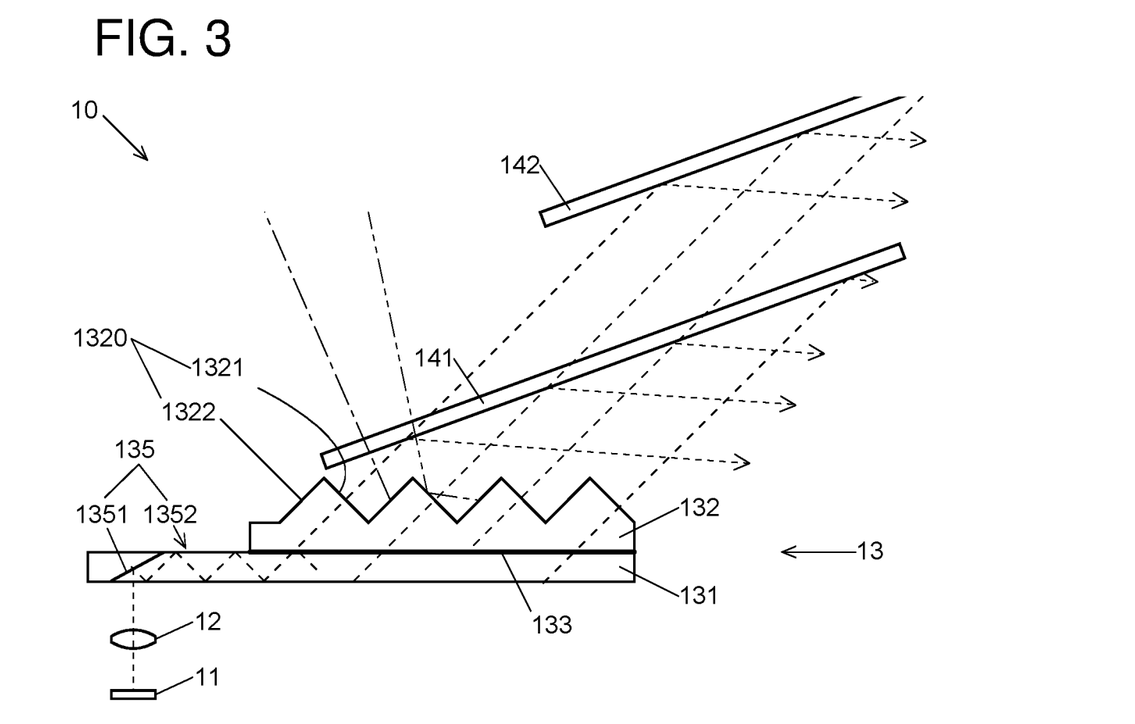
FIG. 3 is a schematic configuration diagram showing a modification of the display device of the first embodiment.

In the above-described embodiments, only one plate member constituting the combiner 14 is provided, but two or more plate members (for example, a first plate 141 and a second plate 142 as shown in FIG. 3) may be provided so as to be substantially parallel to each other. With this, a part of the first incident light that has passed through the first plate 141 out of the light that has passed through the first surface 1321 is reflected by the second plate 142. Thus, the light reflected by the first plate 141 and the light reflected by the second plate 142 are parallel and shifted in position with each other. For this reason, it is possible to further enlarge the area in which the observer can visually recognize an image. Note that although FIG. 3 shows an example in which two plate members are used, and three or more plate members may be used.

Figure 4:
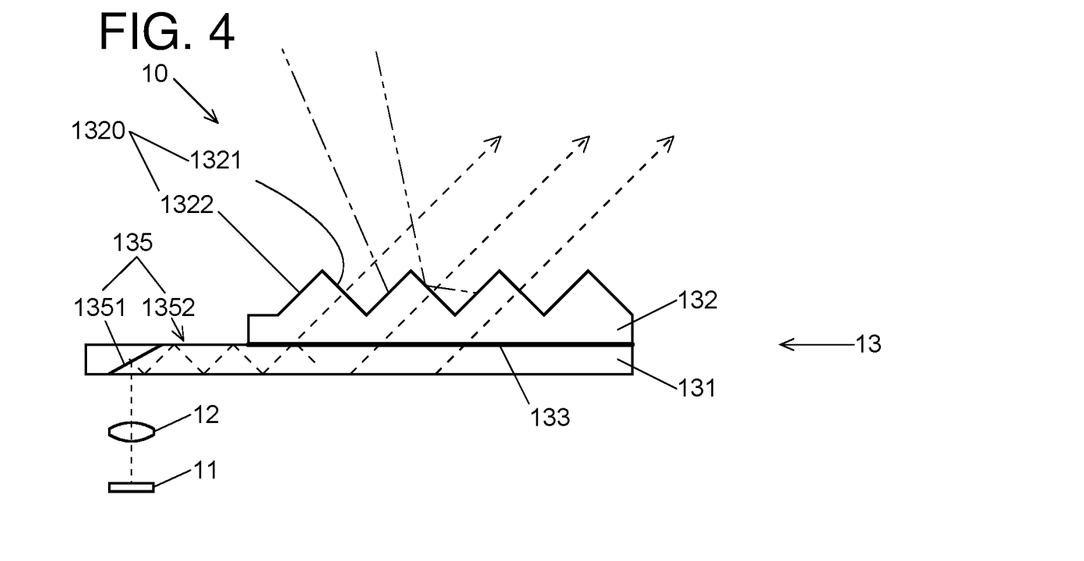
FIG. 4 is a schematic configuration diagram showing another modification of the display device of the first embodiment.

Alternatively, as shown in FIG. 4, the combiner 14 may be omitted. In this instance, the observer can view the image by viewing the optical element 13 for use in the display device from the direction in which the light that has passed through the first surface 1321 propagates.

The configuration other than the combiner 14 have the same configuration as that of the display device 10 of the first embodiment shown in FIGS. 3 and 4 but may be the same configuration as that of the display device 20 of the second embodiment or that of the other modification.

In the above-described embodiments, the light is incident on the first light guide 131 such that the incident angle of the light is an angle satisfying the total reflection condition at the interface between the flat plate of the first light guide 131 and the outside (air). However, it may be configured such that the surface of the first light guide 131 other than the portion in contact with the beam splitter 133 is provided with a coating that reflects light and that the light is incident on the first light guide 131 at an angle deeper than the angle satisfying the total reflection condition. Alternatively, the light may be incident on the first light guide 131 at an angle deeper than the angle satisfying the total reflection condition without subjecting it to such coating. Also in this case, at least a part of the light is reflected by the surface of the first light guide 131, and therefore, it is possible to function as the display device and the optical element for use in the display device.

[Various Aspects]

It will be readily understood by those skilled in the art that the above-described embodiments and the modifications thereof are specific examples of the following aspects.

(Item 1)

A display device according to Item 1 is provided with:
an image display element configured to display an image to be displayed;
a collimator configured to convert light emitted from each point on the image displayed on the image display element into collimated light;
a first light guide formed of a flat plate made of a first material transparent to the light;
a second light guide formed of a plate member made of a second material transparent to the light, the second light guide having one surface and the other surface, the one surface of the second light guide being a flat surface in contact with one of surfaces of the flat plate of the first light guide, the other surface of the second light guide being a sawtooth surface; and
a beam splitter formed at an interface between the first light guide and the flat surface of the second light guide, the beam splitter being configured to transmit a part of the light and reflect the remainder of the light,
wherein the sawtooth surface of the second light guide is configured by alternately combining a first surface and a second surface, the first surface being non-parallel to a propagating direction of the light propagating through the second light guide after passing through the interface and being configured to transmit the light, and the second surface being substantially parallel to the propagating direction.

(Item 6)

An optical element for use in a display device according to Item 6 is an optical element for use in a display device configured to display an image in an enlarged manner based on light obtained by converting light emitted from various points on an image displayed on an image display element into collimated light by a collimator,
the optical element comprising:
a first light guide formed of a flat plate made of a first material transparent to the light;

a second light guide formed of a plate member made of a second material transparent to the light, the second light guide having one surface and the other surface, the one surface of the second light guide being a flat surface in contact with one of surfaces of the flat plate of the first light guide, the other surface of the second light guide being a sawtooth surface; and a beam splitter formed on an interface between the first light guide and the flat surface of the second light guide, the beam splitter being configured to transmit a part of the light and reflect the remainder of the light, wherein the sawtooth surface of the second light guide is configured by alternately combining a first surface and a second surface, the first surface being non-parallel to a propagating direction of the light propagating through the second light guide after passing through the interface and being configured to transmit the light, the second surface being substantially parallel to the propagating direction.

In the display device according to the above-described Item 1 and the optical element for use in the display device according to the above-described Item 6, the light emitted from each point on the image displayed on the image display element and converted into collimated light by the collimator is incident on the beam splitter. A part of the light incident on the beam splitter passes through the beam splitter and is emitted from the first surface of the second light guide. The remainder of the light reflected by the beam splitter without passing through the beam splitter is reflected by the surface opposite to the beam splitter and is incident on the other position of the beam splitter. A part of the light incident on the beam splitter passes through the beam splitter and is emitted from a position of the first surface of the second light guide that differs from the position where the light was first emitted. In this way, at the beam splitter, the transmission of the part of the light and the reflection of the remainder of the light are repeated, and the light that has passed through the beam splitter is emitted. For this reason, the light from each point on the image becomes larger than that when it was incident on the first light guide. This increases the range in which the observer can visually recognize the image.

On the other hand, the light incident on the sawtooth surface of the second light guide from the outside of the display device is at least partially incident on the second surface, or incident on the second surface after being reflected by the first surface. At the second surface, the light is absorbed, reflected, diffusion, dimmed, and the like. Therefore, it is possible to suppress stray light, which is the light emitted to the outside of the light guide again after the external light is incident on the light guide, from being incident on the eyes of the observer.

(Item 2)

According to the display device as recited in Item 2, in the display device as recited in the above-described Item 1, the second surface of the sawtooth surface is a surface that shields or dims visible light.

(Item 7)

According to the optical element for use in a display device as recited in the above-described Item 7, in the optical element for use in a display device as recited in the above-described Item 6, the second surface of the sawtooth surface is a surface configured to shield or dim visible light.

According to the display device according to the above-described Item 2 and the optical element for use in the display device according to the above-described Item 7, the external light directly incident on the second surface of the sawtooth surface of the second light guide from the outside of the display device is shielded or dimmed by the second surface. Alternatively, the external light reflected by the first surface and then incident on the second surface is shaded or dimmed by the second surface. Therefore, the external light can be prevented from being incident on the light guide (in the case of shading) or suppressed (in the case of dimming). Therefore, it is possible to further suppress stray light from entering the eyes of the observer.

In this disclosure, the term "shielding visible light" means preventing the transmission of all the incident visible light and includes the meaning of absorbing all the incident visible light, reflecting all the incident visible light, and scattering all the incident visible light. Also, the term "dimming visible light" means preventing the transmission of a part of the incident visible light and includes the meaning of absorbing a part of the incident visible light, reflecting a part of the incident visible light, and scattering a part of the incident visible light.

(Item 3)

According to the display device as recited in Item 3, in the display device as recited in the above-described Item 1 or 2, the second light guide is provided with a second flat surface at a position closer to a point where the light is introduced from the collimator than the sawtooth surface.

(Item 8)

According to the optical element for use in a display device as recited in the above-described Item 8, in the optical element for use in a display device as recited in the above-described Item 6 or 7, the second light guide is provided with a second flat surface at a position closer to a point where the light is introduced from the collimator than the sawtooth surface.

According to the display device as recited in Item 3 and the optical element for use in the display device as recited in the above-described Item 8, the light that has passed through the beam splitter and reflected by the second flat surface and the light reflected by the beam splitter pass through paths shifted from each other and are emitted from the first surface to the outside of the optical element for use in the display device. Therefore, it is possible to eliminate or reduce the region through which the light does not pass through the first surface, and therefore, the observer can visually recognize the image with less unevenness.

(Item 4)

According to the display device as recited in Item 4, in the display device as recited in any one of the above-described Items 1 to 3, the collimator and the first light guide are arranged such that the light is introduced from the collimator to the first light guide at an angle satisfying a total reflection condition at an interface with an outside in the first light guide.

According to the display device as recited in the above-described Item 4, it is possible to suppress the loss of the light in the first light guide.

(Item 5)

According to the display device as recited in Item 5, in the display device as recited in any one of the above-described Items 1 to 4, it is further provided with:

a combiner formed of a plate member arranged on an optical path of the light emitted from the first surface of the second light guide so as to be non-parallel to the light, the combiner being configured to transmit a part of visible light and reflect the remainder of the visible light.

According to the display device as recited in the above-described Item 5, a part of the light emitted from the first surface of the second light guide is reflected by the combiner and is incident on the eyes of the observer. Furthermore, the observer can visually view the other region of the combiner therethrough. Thus, for example, by arranging the combiner in front of the aircraft's cockpit, the observer sitting in the cockpit can view the image displayed on the image display element in an enlarged manner while observing the front (the opposite side of the combiner).

DESCRIPTION OF SYMBOLS 10, 20: Display device
11: Image display element
12: Collimator
13, 23: Optical element for use in a display device
131, 231: First light guide
1311: One end of the first light guide
132, 232: Second light guide
1320, 2320: Sawtooth surface
1321, 2321: First surface
1322, 2322: Second surface
1323, 2323: Flat surface
133, 233: Beam splitter
134: Side of the first light guide opposite to the beam splitter of the flat plate
135: Introductory optics
1351: Reflective surface
1352: Part of a first light guide not in contact with the second light guide
14: Combiner
141: First plate
142: Second plate
2324: Second flat surface
2325: Second flat surface forming region

The invention claimed is:

1. A display device comprising:
an image display element configured to display an image to be displayed;
a collimator configured to convert light emitted from each point on the image displayed on the image display element into collimated light;
a first light guide formed of a flat plate made of a first material transparent to the collimated light;
a second light guide formed of a plate member made of a second material transparent to the collimated light, the second light guide having one surface and another surface, the one surface of the second light guide being a flat surface in contact with one of surfaces of the flat plate of the first light guide, the another surface of the second light guide being a sawtooth surface; and
a beam splitter formed at an interface between the first light guide and the flat surface of the second light guide, the beam splitter being configured to transmit a part of the collimated light and reflect the remainder of the collimated light,
wherein the sawtooth surface of the second light guide is configured by alternately combining a first surface and a second surface with a repetition interval of 7 µm or more, the first surface being non-parallel to a propagating direction of the collimated light propagating through the second light guide after passing through the interface and being configured to transmit the collimated light, and the second surface being substantially parallel to the propagating direction.

2. The display device as recited in claim 1, wherein the second surface of the sawtooth surface is a surface that shields or dims visible light.

3. The display device as recited in claim 1, wherein the second light guide is provided with a second flat surface at a position closer to a point where the collimated light is introduced from the collimator than the sawtooth surface.

4. The display device described in claim 1, wherein the collimator and the first light guide are arranged such that the collimated light is introduced from the collimator to the first light guide at an angle satisfying a total reflection condition in the first light guide.

5. The display device as recited in claim 1, further comprising:
a combiner formed of a plate member arranged on an optical path of the collimated light emitted from the first surface of the second light guide so as to be non-parallel to the collimated light, the combiner being configured to transmit a part of visible light and reflect the remainder of the visible light.

6. The display device as recited in claim 2, wherein the second light guide is provided with a second flat surface at a position closer to a point where the collimated light is introduced from the collimator than the sawtooth surface.

7. The display device described in claim 2, wherein the collimator and the first light guide are arranged such that the collimated light is introduced from the collimator to the first light guide at an angle satisfying a total reflection condition in the first light guide.

8. The display device as recited in claim 2, further comprising:
a combiner formed of a plate member arranged on an optical path of the collimated light emitted from the first surface of the second light guide so as to be non-parallel to the collimated light, the combiner being configured to transmit a part of visible light and reflect the remainder of the visible light.

9. An optical element for use in a display device configured to display an image in an enlarged manner based on light obtained by converting light emitted from each point on an image displayed on an image display element into collimated light by a collimator,
the optical element comprising:
a first light guide formed of a flat plate made of a first material transparent to the collimated light;
a second light guide formed of a plate member made of a second material transparent to the collimated light, the second light guide having one surface and another surface, the one surface of the second light guide being a flat surface in contact with one of surfaces of the flat plate of the first light guide, the another surface of the second light guide being a sawtooth surface; and
a beam splitter formed on an interface between the first light guide and the flat surface of the second light guide, the beam splitter being configured to transmit a part of the collimated light and reflect the remainder of the collimated light,
wherein the sawtooth surface of the second light guide is configured by alternately combining a first surface and a second surface with a repetition interval of 7 µm or more, the first surface being non-parallel to a propagating direction of the collimated light propagating through the second light guide after passing through the interface and being configured to transmit the collimated light, the second surface being substantially parallel to the propagating direction.

10. The optical element for use in a display device as recited in claim 9,
    wherein the second surface of the sawtooth surface is a surface configured to shield or dim visible light.

11. The optical element for use in a display device as recited in claim 10,
    wherein the second light guide is provided with a second flat surface at a position closer to a point where the collimated light is introduced from the collimator than the sawtooth surface.

12. The optical element for use in a display device as recited in claim 6,
    wherein the second light guide is provided with a second flat surface at a position closer to a point where the collimated light is introduced from the collimator than the sawtooth surface.

\* \* \* \* \*